Jan. 17, 1939.  H. W. BATCHELLER  2,144,139
FUSED SWITCH
Filed Aug. 26, 1937
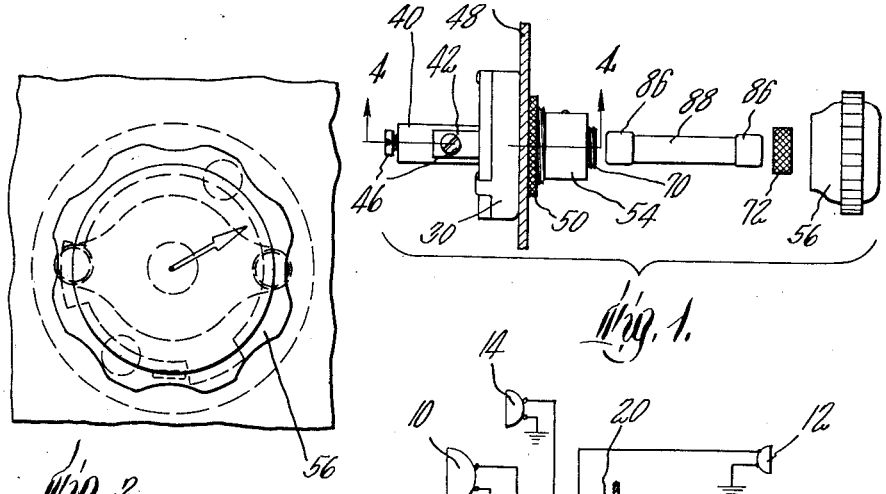
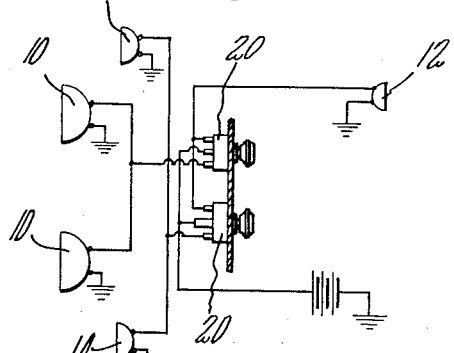
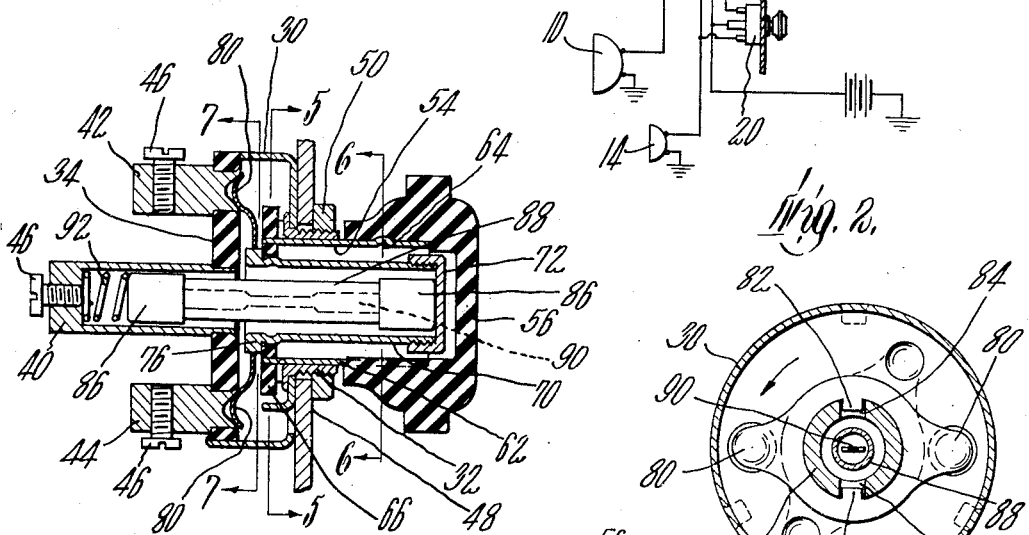
Inventor
Hugh W. Batcheller
by Wright, Brown, Quinby & May
Attys.

Patented Jan. 17, 1939

2,144,139

UNITED STATES PATENT OFFICE 2,144,139

FUSED SWITCH

Hugh W. Batcheller, Newton, Mass., assignor to Standard Mfg. Co., Worcester, Mass., a corporation of Massachusetts Application August 26, 1937, Serial No. 161,061

5 Claims. (Cl. 200—114)

This invention relates to a fused switch of the rotary type wherein a knob is turned to move a contact arm into and out of contact with one or more stationary points. More particularly the invention relates to switches such as may be used in automobiles to control lights, fan motors and the like.

The embodiment of the invention herein shown and described is in the form of an auxiliary switch attachable to the dashboard of an automobile to control extra lights which are not original equipment of an automobile but which should be in a fused circuit. According to the invention, a switch for extra lights is provided with a fuse incorporated therein, the switch itself having a hollow rotatable operating knob and shaft in which the fuse is housed, and being adapted for mounting on the dashboard of an automobile.

For a more complete understanding of the invention, reference may be had to the description thereof which follows, and to the drawing of which—

Figure 1 is a side elevation of a switch embodying the invention, some of the parts being shown separated from each other.

Figure 2 is a wiring diagram showing a use of the switch illustrated in Figure 1.

Figure 3 is a front elevation of the switch shown in Figure 1.

Figure 4 is a longitudinal section of the same.

Figure 5 is a section on the line 5—5 of Figure 4.

Figure 6 is a section on the line 6—6 of Figure 4.

Figure 7 is a section on the line 7—7 of Figure 4.

The drawing illustrates a switch adapted to be mounted on the dashboard of an automobile so as to be used for controlling certain lights or for any other desired purpose. Figure 2 illustrates a wiring diagram for an automobile having headlights and additional road lights. The latter are usually supplied as extra accessories rather than as a part of the original equipment of an automobile. Hence, they must be connected to the battery by an extra circuit which is distinct from the circuits originally installed in the automobile. The latter are fused, and the extra circuit must also be supplied with a fuse. It is troublesome to find a suitable place to mount the extra fuse and to install and connect the fuse holder. According to the invention, this trouble is obviated by incorporating a fuse in a switch which can be mounted on the dashboard. If two such switches are employed as indicated in Figure 2, all of the lights of the automobile may be properly fused thereby, the fuses being readily accessible for removal or replacement. The diagram illustrates a pair of headlights 10, a rear or tail light 12, and a pair of road lights 14. It is desirable that either the headlights or the road lights be available, or both together, but that, when either or both of these sets of lights are in use, the tail light should be on. To this end, a pair of switches 20 may be supplied, each switch having three terminals, one of which is connected to the battery, a second terminal being connected to the tail light 12. The third terminal of one switch may be connected to the headlights 10, the third terminal of the other switch being connected to the road lights 14 as indicated in Figure 2.

The structure of the switches 20 is illustrated in detail in Figure 4. This structure includes a cup-shaped housing member 30 having a neck 32 projecting from a central aperture therein and either integral therewith or securely fastened thereto. The housing member 30 is closed at the rear by a base or plate 34 of insulating material such as fiber. Three terminal members 40, 42 and 44 extend through the plate 34 and project rearwardly therefrom. These terminal members may be provided with screws 46 by which wires may be attached thereto.

The neck 32 of the housing is adapted to project through an aperture in the dashboard 48 of an automobile, or other supporting element, and is externally screw-threaded to receive a ring nut 50 by which the switch assembly may be clamped tightly against the supporting member 48. The neck 32 also serves as a bearing for a hollow shaft 54 which extends into the housing 30 and projects forwardly from the neck 32 so as to receive thereon an operating knob 56. This operating knob is made hollow so as to fit over the forward portion of the shaft 54 and is splined thereto by a key 60 formed on the inner wall of the knob and engaging in a slot 62 in the shaft 54. The shaft may also be provided with a slight lateral projection 64 which enters a corresponding indentation in the inner wall of the knob so as to prevent too easy removal of the knob from the shaft. A fiber disk 66 may be permanently secured to the inner or rear end of the shaft 54 so as to rotate with the shaft when the knob 56 is turned. Also secured to the disk 66 is a tubular member or sleeve 70 which is nested coaxially within but is insulated from the shaft 54 and projects through a central aperture in the disk 66. The forward end of the tubular member 70 is provided with a removable closure such as a metal cap 72 screw-threaded on the end or otherwise removably secured thereto. A thick flange 76 at the rear end of the tubular member 70 bears against the rear face of the disk 66 and is surrounded by a metal bridging conductor having radially extending portions 80 adapted to move into simultaneous contact with the forward ends of the terminal members 42 and 44. The bridging conductor 80 is keyed to the tubular member 70 by a pair of projections 82 which enter corresponding notches 84 in the flange 76. Since the tubular member 70 and the shaft 54 are both firmly secured to the disk 66, these three elements are virtually a single member and turn together as a unit when the operating knob 56 is rotated. The rotation of the tubular member 70 causes the extensions 80 of the bridging conductor to describe arcuate paths against the forward face of the insulating plate 34 so that the extensions 80 move simultaneously into and out of contact with the terminal members 42 and 44.

The circuit through the switch from the terminals 42 and 44 to the central terminal 40 is completed by a fuse which, as shown, is preferably of the cartridge type consisting of a pair of metal end caps 86 on the ends of a tube 88 of insulating material such as fiber, glass or the like. Within the tube is disposed a fusible element 90 the ends of which are connected respectively to the end caps 86. As shown, the tubular member 70 and the terminal member 40 are hollow and alined so that they constitute a casing in which is loosely fitted the cartridge fuse. A compression spring 92 is inserted in the hollow terminal member 40 so as to bear against the adjacent end cap of the fuse and to press the opposite end cap of the fuse against the end cap 72 of the tubular member 70. Hence, when the bridging conductor 80 is in contact with the terminal members 42 and 44, these members are then connected electrically through the conductor 80, the tubular member 70, the cap 72, the fuse 84 and the spring 92 to the terminal member 40. As is evident from Figures 4, 5, 6 and 7, the cartridge fuse and the tubular member 70 are substantially coaxial with the shaft 54, these members being nested one within the other so that the switch as a whole is compact in structure.

When it becomes necessary to remove or replace a fuse, the knob 56 is readily pulled off from the end of the shaft 54, whereupon the metal cap 72 is unscrewed or otherwise removed from the forward end of the tubular member 70. The spring 92 then pushes the fuse so that its forward end projects beyond the end of the tubular member 70 and is easily grasped.

It is evident that various modifications and changes may be made in the embodiment of the invention herein shown and described without departing from the spirit or scope thereof as defined in the following claims.

I claim:

1. A fused electric switch comprising a cylindrical casing, a cartridge fuse loosely fitted therein, said casing having a portion at its forward end removable for the insertion and removal of said fuse, a compression spring within said casing pressing against one end thereof and pressing said fuse against the other end thereof, an operating member rotatable about the long axis of said casing, a terminal electrically connected to the rear end of said fuse, a second terminal, a bridging conductor connected to the forward end of said fuse and movable by rotation of said operating member into and out of contact with said second terminal.

2. A fused electric switch comprising a cylindrical casing having a stationary portion and a rotatable portion, said portions having metallic ends insulated from each other, a cartridge fuse within said casing, a compression spring in said casing pressing against one said end and pressing said fuse against the other said end, a terminal connected to the end of said stationary portion, a second terminal, a bridging conductor connected to said rotatable portion and movable by rotation thereof into and out of contact with said second terminal, and operating means including a hollow shaft surrounding said rotatable portion and rotatable therewith, and a finger knob on said shaft.

3. A fused electric switch comprising a casing, a cartridge fuse loosely fitted in said casing, said casing having a forward end portion removable for the insertion and removal of a fuse, a pair of terminals, one of said terminals being electrically connected to an end of said fuse, a bridging conductor electrically connected to the other end of said fuse and movable into and out of contact with the other terminal, and an operating member coaxial with said casing and rotatable about the long axis of said casing to move said bridging conductor, said operating member including a finger knob normally enclosing the forward end of said casing and removable to expose said forward end.

4. A fused electric switch comprising a housing including a rear plate of insulating material, a tubular central terminal mounted on and extending through said plate, a rotatable insulating disk in front of said plate, a tubular sleeve projecting through the center of said disk and alined with said terminal, a metal cap removably mounted on the forward end of said sleeve, a cartridge fuse housed within said terminal and sleeve, a spring within said terminal bearing on one end of said fuse to press the other end of the fuse against said cap, an offset terminal mounted on said plate, a conductor between said plate and disk having a portion movable on said plate by rotation of the disk into and out of contact with said offset terminal, said conductor being in constant electrical contact with said sleeve, a tubular shaft projecting forward from said disk and surrounding said sleeve, and an operating knob removably mounted on said shaft.

5. In a fused switch, a housing, a rotatable tubular shaft projecting from said housing, a removable knob on the end of said shaft, a sleeve coaxially mounted within and insulated from said shaft, a cap removably mounted on an end of said sleeve, a cartridge fuse within said sleeve, spring means pressing an end of said fuse against said cap, a pair of terminals mounted on said housing, a conductor movable by rotation of said shaft into and out of contact with said terminal, a second terminal, and means including said fuse and sleeve electrically connecting said second terminal with said conductor.

HUGH W. BATCHELLER.